US008518608B2

(12) United States Patent
Wu et al.

(10) Patent No.: US 8,518,608 B2
(45) Date of Patent: Aug. 27, 2013

(54) PREPARATION OF SUPPORTED ELECTROCATALYST COMPRISING MULTIWALLED CARBON NANOTUBES

(75) Inventors: Gang Wu, Los Alamos, NM (US); Piotr Zelenay, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 251 days.

(21) Appl. No.: 13/105,714

(22) Filed: May 11, 2011

(65) Prior Publication Data

US 2011/0281204 A1 Nov. 17, 2011

Related U.S. Application Data

(60) Provisional application No. 61/333,667, filed on May 11, 2010.

(51) Int. Cl.
| | |
|---|---|
| H01M 4/88 | (2006.01) |
| H01M 4/90 | (2006.01) |
| B82Y 30/00 | (2011.01) |
| B82Y 40/00 | (2011.01) |
| B01J 21/18 | (2006.01) |
| B01J 23/74 | (2006.01) |
| H01M 8/10 | (2006.01) |

(52) U.S. Cl.
USPC ........... 429/535; 429/527; 977/846; 977/847; 977/745; 502/185

(58) Field of Classification Search
USPC ................ 502/185; 977/846, 847, 745, 746, 977/748; 252/502, 503; 428/367, 368; 429/527, 535
See application file for complete search history.

(56) References Cited

U.S. PATENT DOCUMENTS

2005/0025974 A1 * 2/2005 Lennhoff ..................... 428/408

FOREIGN PATENT DOCUMENTS

WO WO 2005103109 A1 * 11/2005
WO WO 2009101231 A1 * 8/2009

OTHER PUBLICATIONS

Lefevre, et al., "Iron-Based Catalysts with Improved Oxygen Reduction Activity in Polymer Electrolyte Fuel Cells," Science, Apr. 3, 2009, vol. 324, pp. 71-74.
Wu, et al., "Pt-free cathode catalysts prepared via multi-step pyrolysis of Fe phthalocyanine and phenolic resin for fuel cells," Chem. Commun., May 27, 2010, vol. 46, pp. 6377-6379.
Wu, et al., "Polyaniline-derived non-Precious Catalyst for the Polymer Electrolyte Fuel Cell Cathode," ECS Transactions, 2008, vol. 2, No. 16, pp. 159-170.
Wu, et al., "Performance Durability of Polyaniline-derived non-Precious Cathode Catalysts," ECS Transactions, 2009, vol. 1, No. 25, pp. 1299-1311.
Jaouen, et al., "Recent advances in non-precious metal catalysis for oxygen reduction reaction in polymer electrolyte fuel cells," Energy Environ. Sci, 2011, vol. 4, pp. 114-130.
Nallathambi, et al., "Development of high performance carbon composite catalyst for oxygen reduction reaction in PEM Proton Exchange Membrane fuel cells," Journal of Power Sources, 2008, vol. 18, pp. 34-42.

(Continued)

Primary Examiner — Gregg Cantelmo
(74) Attorney, Agent, or Firm — Samuel L. Borkowsky

(57) ABSTRACT

A process for preparing a durable non-precious metal oxygen reduction electrocatalyst involves heat treatment of a ball-milled mixture of polyaniline and multiwalled carbon nanotubes in the presence of a Fe species. The catalyst is more durable than catalysts that use carbon black supports. Performance degradation was minimal or absent after 500 hours of operation at constant cell voltage of 0.40 V.

6 Claims, 6 Drawing Sheets

(56) References Cited

OTHER PUBLICATIONS

Wu, et al., "Titanium dioxide-supported non-precious metal oxygen reduction electrocatalyst," Chem. Commun., 2010, vol. 46, pp. 7489-7491.

Shao, et al., "Novel catalyst support materials for PEM fuel cells: current status and future prospects," J. Mater. Chem., Nov. 2008, vol. 19, pp. 46-59.

Shao, et al., "Understanding and approaches for the durability issues of Pt-based catalysts for PEM fuel cell," J. Power Sources, 2007, vol. 171, pp. 558-566.

Wang, et al., "Proton Exchange Membrane Fuel Cells with Carbon Nanotube Based Electrodes," Nano Lett., 2004, vol. 4, pp. 345-348.

Wu, et al., "Carbon nanotube supported Pt electrodes for methanol oxidation: A comparison between multi- and single-walled nanotubes," J. Power Sources, Aug. 2007, vol. 174, pp. 148-158.

Wu, et al., "Remarkable support effect of SWNTs in Pt catalyst for methanol electrooxidation," Electrochem. Commun., Aug. 2005, vol. 7, pp. 1237-1243.

Zhang, et al., "Carbon nanotube architectures as catalyst supports for proton exchange membrane fuel cells," Energy Environ. Sci., 2010, vol. 3, pp. 1286-1293.

Li, et al., "Electro-catalytic oxidation of CO on Pt catalyst supported on carbon nanotubes pretreated with oxidative acids," Carbon, Jul. 2006, vol. 44, pp. 2973-2983.

Inaba, et al., "Effect of Agglomeration of Pt/C Catalyst on Hydrogen Peroxide Formation," Electrochem. Solid State Lett., 2004, vol. 7, p. A474.

Wu, et al., "Carbon-supported $Co_{1.67}Te_2$ nanoparticles as elctrocatalysts for oxygen reduction reaction in alkaline electrolyte," Journal of Materials Chemistry, Feb. 23, 2009, vol. 19, pp. 6581-6589.

Wang, et al., "Effect of the Pre-Treatment of Carbon Black Supports on the Activity of Fe-Based Electrocatalysts for the Reduction of Oxygen," J. Phys. Chem. B, Mar. 1999, vol. 103, pp. 2042-2049.

Wu, et al., "Nitrogen-doped magnetic onion-like carbon as support for Pt particles in a hybrid cathode catalyst for fuel cells," Journal of Materials Chem., 2010, vol. 20, pp. 3059-3068.

Drillet, et al., "Development of self-supported single-wall carbon nanotube-based gas diffusion electrode with spatially well-defined reaction and diffusion layers," J. Power Sources, Jul. 2010, vol. 195, pp. 8084-8088.

Oh, et al., "Corrosion resistance and sintering effect of carbon supports in polymer electrolyte membrane fuel cells," Electrochim. Acta, 2009, vol. 54, pp. 6515-6521.

Qu, et al., "Nitrogen-Doped Graphene as Efficient Metal-Free Electrocatalyst for Oxygen Reduction in Fuel Cells," www.acsnano.org, 2010, vol. 4, No. 3, pp. 1321-1326.

\* cited by examiner

PREPARATION OF SUPPORTED ELECTROCATALYST COMPRISING MULTIWALLED CARBON NANOTUBES

RELATED APPLICATIONS

This application claims the benefit of U.S. Provisional Patent Application Ser. No. 61/333,667 entitled "Fuel Cell Catalysts," filed May 11, 2010, incorporated by reference herein.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to the preparation of supported electrocatalysts for electrochemical fuel cells.

BACKGROUND OF THE INVENTION

Electrochemical fuel cells convert fuel such as $H_2$ or methanol, and oxidant such as air or $O_2$, to electricity and reaction product. Solid polymer electrochemical fuel cells generally employ a membrane electrode assembly ("MEA") in which an electrolyte in the form of an ion-exchange membrane is disposed between an anode layer and a cathode layer. These electrode layers are made from porous, electrically conductive sheet material such as carbon fiber paper or carbon cloth. In a typical MEA, the electrode layers provide structural support to the membrane which typically thin and flexible. The MEA contains an electrocatalyst that typically is composed of finely divided platinum particles in a layer at each membrane/electrode layer interface, to catalyze the desired electrochemical reaction. The electrodes are electrically coupled to provide a path for conducting electrons between the electrodes through an external load.

Hydrogen/air polymer electrolyte fuel cells (PEFCs) are considered a promising technology to replace internal combustion engines for automotive propulsion. However, a major drawback of current PEFC technology is their high cost, largely due to the use of platinum-based catalysts at both the anode (10%) and cathode (90%) [1].

Two general paths have been considered to reduce the cost of PEFC cathode catalysts. One path is to improve the activity for oxygen reduction reaction (ORR) of platinum-based catalysts by nano-structuring or alloying. Another path is to replace the platinum-based catalysts with lower cost, non-precious metal catalysts (NPMCs) [2]. A major challenge is developing NPMCs that are both highly active and durable because high activity is often couple with fast degradation [3].

NPMCs have been prepared using nitrogen-containing polymeric precursors including ethylenediamine, polypyrrole, and polyaniline (PANT) [4-6]. Graphene structures were observed from highly magnified images of at least some of these catalysts. It is possible that the graphene present in these materials might provide stability to the catalyst [4-7].

Corrosion of carbon supports likely contributes to the degradation of carbon-supported NPMC-based electrocatalysts [8]. Carbon black supports are used most widely with fuel cell electrocatalysts due to a good balance of electron conductivity, surface area, and cost. Although slow at voltages below approximately 1.2 V, carbon corrosion is thermodynamically favorable at voltages higher than 0.20 V, which are typical conditions for fuel cell cathode operation. Therefore, many carbon black-supported ORR electrocatalysts, in particular precious metal electrocatalysts, suffer from performance loss caused by carbon corrosion [9,10].

Carbon nanotubes have been considered as supports for electrocatalysts in fuel cells due to their high electron conductivity and corrosion resistance [11]. Some studies have shown improved performance of Pt electrocatalysts for methanol oxidation and oxygen reduction reactions using single-walled and multi-walled carbon nanotubes as support materials [12-14].

A need remains for active, durable, non-precious metal electrocatalysts for the oxygen reduction reaction for fuel cells.

SUMMARY OF THE INVENTION

The present invention provides process for preparing a durable, non-precious metal electrocatalyst for a cathode for the oxygen reduction reaction of a polymer electrolyte fuel cell. This electrocatalyst includes a carbon-based support derived from multi-walled carbon nanotubes and a polyaniline. An embodiment electrocatalyst of this invention was prepared by heat-treating a precursor material containing PANI and MWNTs in the presence of a Fe species. The heat treated samples were pre-leached in sulfuric acid to remove unstable and inactive species. A significant improvement in durability was observed with these catalysts compared to analogs prepared using carbon blacks such as Vulcan XC-72 (XC-72), Ketjenblack EC300J (KJ-300J), and Black-Pearl2000 (BP2000).

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1a shows steady-state RDE polarization plots, FIG. 1b shows hydrogen peroxide yield plots, FIG. 1c shows initial fuel cell polarization plots, and FIG. 1d shows a plot for a fuel cell life test. The cell temperature was 80° C.

DETAILED DESCRIPTION OF THE INVENTION

Figure 1A:
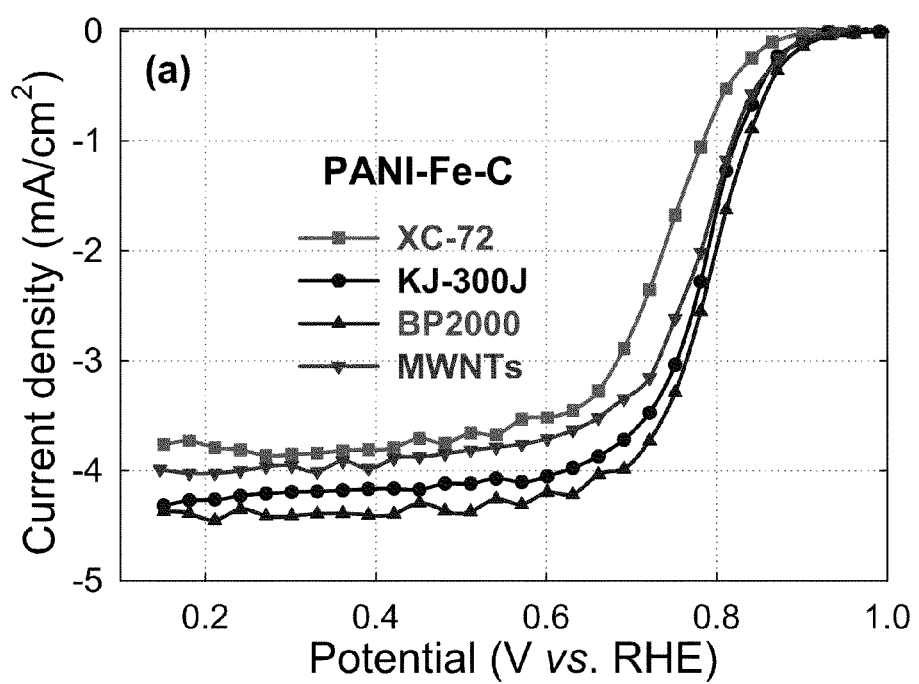
FIGS. 1a through 1d show graphs that depict catalytic performance for PANI-Fe catalysts supported on various carbon materials, including multi-walled carbon nanotubes (MWNTs).

The present invention relates to catalysts useful in polymer electrolyte fuel cells. The invention also relates to polymer electrolyte fuel cells containing the catalysts and catalyst supports. The present invention further relates to methods of making the catalysts and catalyst supports.

In all embodiments of the present invention, all percentages are by weight of the total composition, unless specifically stated otherwise. All ranges are inclusive and combinable. All numerical amounts are understood to be modified by the word "about" unless otherwise specifically indicated.

All documents cited in the Detailed Description of the Invention are, in relevant part, incorporated herein by reference; the citation of any document is not to be construed as an admission that it is prior art with respect to the present invention.

To the extent that any meaning or definition of a term in this document conflicts with any meaning or definition of the same term in a document incorporated by reference, the meaning or definition assigned to that term in this document shall govern.

An embodiment PANI-Fe-MWNT electrocatalyst was prepared using commercially available multi-walled carbon nanotubes having a BET surface area of approximately 230 square meters per gram were used. A sample of these MWNTs was treated in 1.0 M HCl solution to remove impurities and then oxidized in a solution containing nitric acid and sulfuric acid [15]. Approximately 2.0 milliliters of aniline was dispersed in 0.5 M hydrochloric acid solution. The oxidant ammonium persulfate $(NH_4)_2S_2O_8$, APS) and ferric chloride were added. About 0.5 g of the resulting oxidized MWNTs was mixed with the solution of polymerized PANI. The resulting suspension was vacuum-dried using a rotary evaporator to produce a mixture. This mixture was ball-milled for 24 hours. After the ball milling, the resulting mixture was heated at temperature of 900° C. in an inert atmosphere for one hour. After cooling, the now heat-treated sample was then pre-leached in 0.5 M $H_2SO_4$ to remove unstable and inactive species. In the final step, the mixture was heat-treated again under identical conditions to the first heat treatment. The product was labeled as PANI-Fe-MWNTs. Although PANI is used in this label, it merely indicates that PANI was used to prepare the electrocatalyst. There is likely no PANI remaining after the heat treatment.

The synthesis was repeated under identical conditions with the exception that traditional carbon blacks were used instead of MWNTs.

The embodiment electrocatalyst labeled as PANI-Fe-MWNTs that was prepared with MWNTs as described above was compared to the catalysts prepared with carbon blacks.

Oxygen reduction reaction (ORR) activity was electrochemically evaluated using a rotating disk electrode (RDE). Selectivity for the four-electron reduction of oxygen was determined by rotating-ring-disk electrode (RRDE). Performance data was recorded at a total catalyst loading of 0.6 milligrams per square centimeter (mg cm$^{-2}$) in 0.5 M $H_2SO_4$ at a rotating disk speed of 900 rpm and room temperature. The non-precious metal electrocatalysts were further tested at the fuel cell cathode to evaluate their activity and durability under PEFC operating conditions. The cathode catalyst loading was 4 mg cm$^{-2}$. A commercially-available Pt-catalyzed cloth GDL (E-TEK, 0.25 mg$_{Pt}$cm$^{-2}$) and Nafion 1135 were used as the anode and membrane, respectively.

High-resolution transmission electron microscopy (HR-TEM) images were taken on a JEOL 3000F microscope operating at 300 kV at Oak Ridge National Laboratory. The crystallinity of various samples was determined by X-ray diffraction (XRD) using a BRUKER AXS D8 Advance diffractometer with Cu Kα radiation.

Figure 1B:
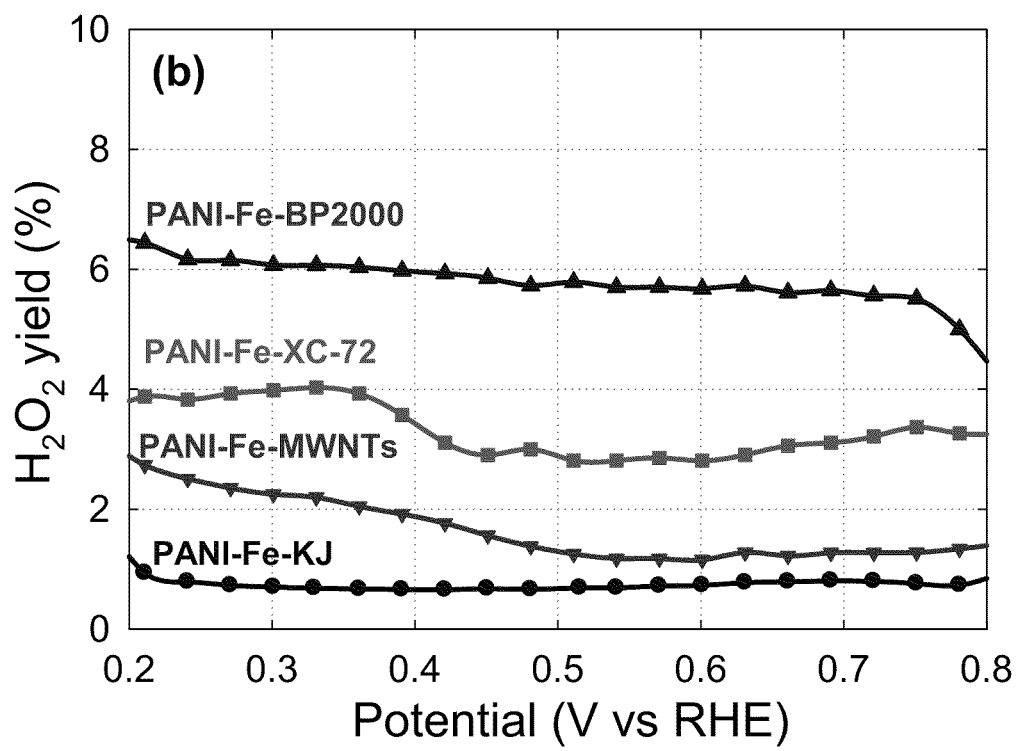

FIG. 1a and FIG. 1b compare the ORR activities and four-electron selectivities, respectively, of the PANI-Fe-C electrocatalysts as a function of the support materials (MWNTs, XC-72, KJ-300J, and BP2000) using RDE and RRDE. Results show similar measured onset potentials of approximately 0.91 V for these electrocatalysts, which suggests that the carbon support does not change the nature of active site, but just affects the site distribution reflected by different half-wave potentials ($E_{1/2}$). The most positive $E_{1/2}$ was observed with the BP2000 supported catalyst; this may be attributed to its having the highest BET surface area (approximately 1400 m$^2$g$^{-1}$), which enables it to accommodate the highest density of active sites.

The lowest $H_2O_2$ yield was obtained from the KJ-300J supported electrocatalyst, which was below 1% across at all electrode potentials. This was followed by the embodiment MWNT supported electrocatalyst, which was 2% $H_2O_2$ at 0.4 V. Such low peroxide yields indicate an almost complete reduction of $O_2$ to $H_2O$ in a four-electron process rather than to $H_2O_2$ in a much less efficient two-electron reaction. This is a truly unique result for a NPMC, matching the four-electron selectivity of Pt-based catalysts (3-4% $H_2O_2$ yield at 0.4 V on 14 μg$_{Pt}$cm$^{-2}$ Pt/C) [16]. XC-72 and BP2000 supported catalyst show slightly higher $H_2O_2$ yields, possibly due to their relatively small degree of graphitization [17].

Figure 1C:
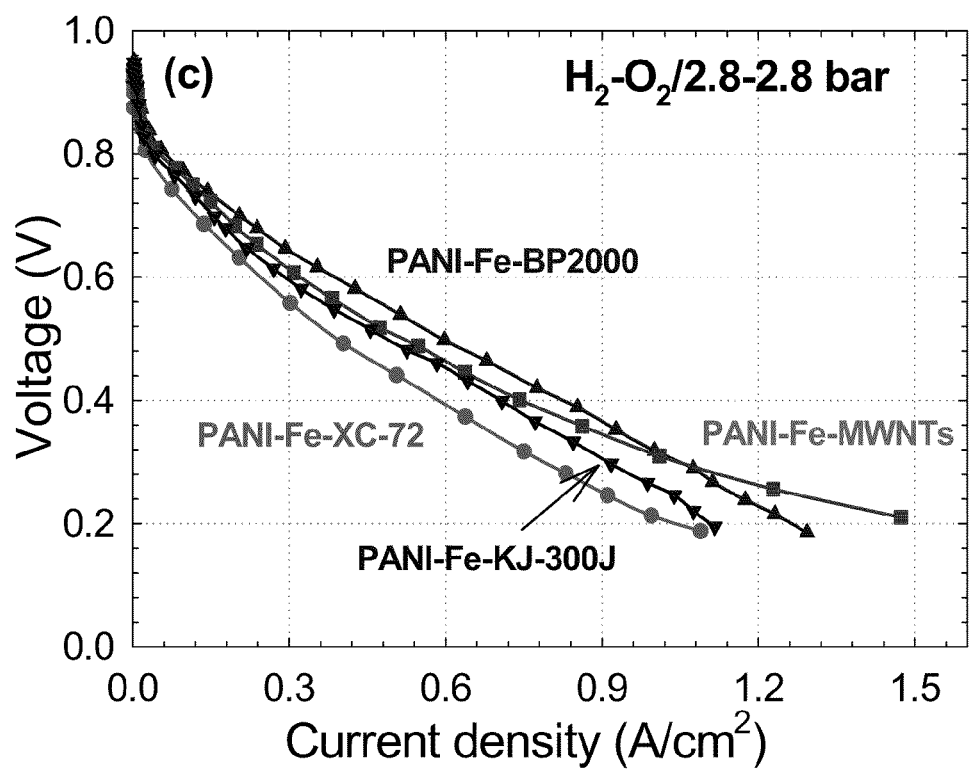
Figure 1D:
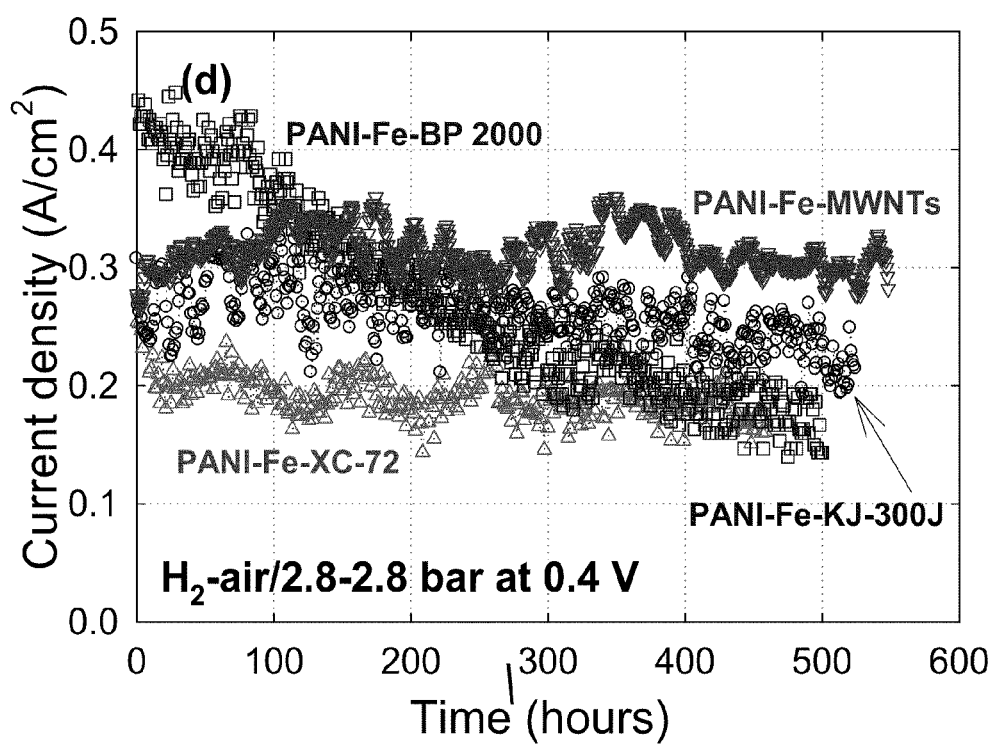

FIG. 1c and FIG. 1d compare the initial fuel cell polarization plots and life test data, respectively, obtained with the electrocatalysts supported on various carbon materials. In good agreement with RDE test, fuel cell polarization plots show nearly identical performance for all electrocatalysts at high potential range (0.8 V), but the MWNT-supported embodiment electrocatalyst offers a noticeable performance advantage in the low voltage (<0.3 V). This performance advantage is likely caused by a more open structure provided by the MWNTs relative to that of carbon black [18]. Importantly, in addition to offering mass-transfer benefits at high current densities, the embodiment MWNT-supported electrocatalyst shows virtually no performance degradation for more than 500 hours at a cell voltage of 0.40 V constantly generating a current density of 0.3 amperes per square centimeter (Acm$^{-2}$). This represents a significant improvement over the carbon black-supported catalysts that exhibit performance loss. Since carbon nanotubes do not possess micro-porosity, except in the interior of the tube, and they tend to pack into a much more open structure than approximately spherical carbon-black particles, the active catalytic sites on the nanotubes are likely to be easily accessible [14]. Also, mass transfer and water removal from the electrocatalyst surface should be facilitated, an important advantage, especially in the case of non-precious catalyst layers approaching 100 μm in thickness [19]. The observed higher durability of the embodiment MWNT-supported electrocatalyst also may be related to a higher degree of graphitization of MWNTs, leading to an enhanced corrosion resistance and improved stability of the ORR active site(s) [20].

Figure 2:
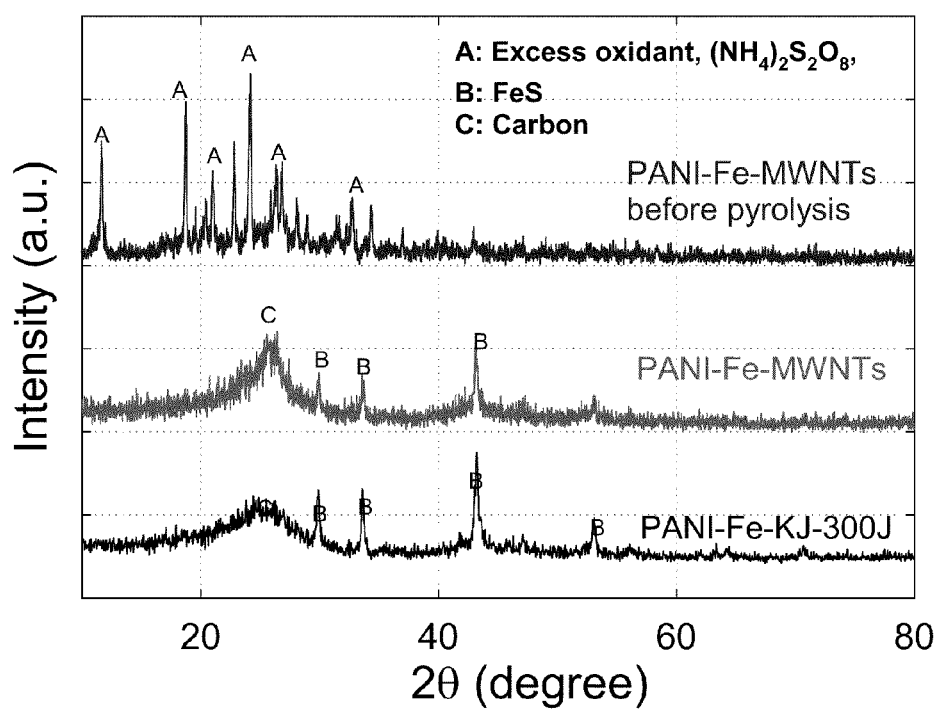
FIG. 2 shows XRD patterns for an embodiment PANI-Fe catalyst supported by MWNTs and another PANI-Fe catalyst supported by Ketjenblack-EC300J (KJ-300J).

In order to understand the effect of MWNTs on the durability enhancement in a fuel cell, the electrocatalyst was subjected to extensive physical characterization. XRD patterns for the PANI-Fe catalysts supported by MWNTs and KJ-300J are shown in FIG. 2. The results indicate that heat treatment results in a dominant formation of FeS in the PANI-derived catalysts [4]. The sulfur source in the catalyst system is derived from the $(NH_4)_2S_2O_8$, which was used for polymerizing the aniline to polyaniline (PANT). Unlike for the PANI-Fe-KJ-300J catalyst, the subsequent acid leaching was more effective for removing FeS aggregates from the PANI-Fe-MWNTs sample. This may suggest that, under identical experimental conditions, more active sites could be exposed in PANI-Fe-MWNTs, with a possible improvement in the catalysts activity [6].

Figure 3:
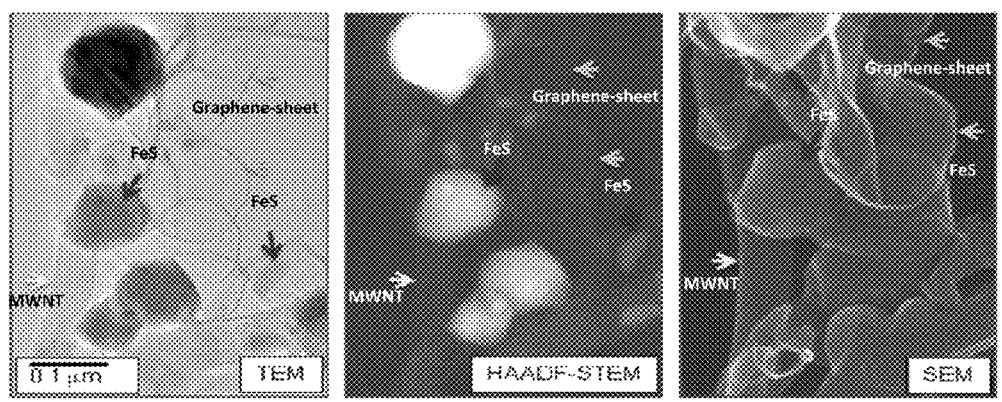
FIG. 3 shows micrographs of an embodiment PANI-Fe-MWNTs catalyst focusing on the same spot determined by three types of microscopy techniques (a) TEM, (b) HAADF-STEM, and (c) SEM.

The embodiment MWNT-supported electrocatalyst was also examined using HR-TEM. Subtleties in its nanostructure are revealed in the images of HR-TEM, and high-angle annular dark-field scanning transmission electron microscopy (HAADF-STEM), and SEM of the same field of view of for the embodiment electrocatalyst as shown in FIG. 3. It is very likely that the aggregates observed in the embodiment electrocatalyst are FeS, based on the chemical phases identified by X-ray diffraction (XRD). Importantly, graphene-sheet-like structures were found dominant in the embodiment MWNT-supported electrocatalyst. These graphene sheets are indicated by a label co-located with the FeS regions/particles. Also MWNTs are still obviously present in the catalysts. On the other hand, unlike the embodiment MWNT-supported electrocatalyst, no such graphene sheets were observed in carbon black supported electrocatalysts, such as the PANI-Fe-KJ-300J sample. Thanks to the unique properties of graphene sheets, such as high surface area, good conductivity, and a graphitized basal-plane structure [21], the presence of graphene-sheet-like structures presumably contributes to the increased catalytic performance of the embodiment MWNT-supported electrocatalyst relative to the carbon black supported PANI-Fe ones. There appears to be a correlation between the appearance of graphene sheets and higher durability [6].

In summary, the embodiment MWNT-supported electrocatalyst exhibited much improved performance durability for oxygen reduction when compared to traditional carbon black supported materials. This represents a significant improvement over the carbon black-supported catalysts that exhibit performance loss. The unique structure of carbon nanotube in the PANI-Fe-MWNT catalyst would be beneficial for mass transfer, water removal from catalyst surface, corrosion resistance and electron conductivity. The presence of graphene-sheet-like structures may contribute to the increased catalytic performance.

REFERENCES

The references below are incorporated by reference herein.
[1] Jaouen et al., "Recent advances in non-precious metal catalysis for oxygen reduction reaction in polymer electrolyte fuel cells," Energy Environ. Sci, 2011, vol. 4, pp. 114-130.
[2] Wu et al., "Pt-free cathode catalysts prepared via multi-step pyrolysis of Fe phthalocyanine and phenolic resin for fuel cells," Chem. Commun., August 2010, vol. 46, pp. 6377-6379.
[3] Lefevre et al., "Iron-Based Catalysts with Improved Oxygen Reduction Activity in Polymer Electrolyte Fuel Cells," Science, April 2009, vol. 324, pp. 71-74.
[4] Wu et al., "Polyaniline-derived Non-Precious Catalyst for the Polymer Electrolyte Fuel Cell Cathode," ECS Trans., October 2008, vol. 16, pp. 159-170.
[5] Wu et al., "Performance Durability of Polyaniline-derived Non-Precious Cathode Catalysts," ECS Trans., October 2009, vol. 25, pp. 1299-1311.
[6] Wu et al., "Titanium dioxide-supported non-precious metal oxygen reduction electrocatalyst," Chem. Commun., 2010, vol. 46, pp. 7489
[7] Wu et al., "Nitrogen-doped magnetic onion-like carbon as support for Pt particles in a hybrid cathode catalyst for fuel cells," J. Mater. Chem., February 2010, vol. 20, pp. 3059-3068.
[8] Shao et al., "Novel catalyst support materials for PEM fuel cells: current status and future prospects," J. Mater. Chem., November 2008, vol. 19, pp. 46-59.
[9] Shao et al., "Understanding and approaches for the durability issues of Pt-based catalysts for PEM fuel cell," J. Power Sources, 2007, vol. 171, pp. 558-566.
[10] Wu et al., "Carbon-supported $Co_{1.67}Te_2$ nanoparticles as electrocatalysts for oxygen reduction reaction in alkaline electrolyte," J. Mater. Chem., July 2009, vol. 19, pp. 6581-6589.
[11] Wang et al., "Proton Exchange Membrane Fuel Cells with Carbon Nanotube Based Electrodes," Nano Lett., 2004, vol. 4, pp. 345-348.
[12] Wu et al., "Carbon nanotube supported Pt electrodes for methanol oxidation: A comparison between multi- and single-walled nanotubes," J. Power Sources, August 2007, vol. 174, pp. 148-158.
[13] Wu et al., "Remarkable support effect of SWNTs in Pt catalyst for methanol electrooxidation," Electrochem. Commun., August 2005, vol. 7, pp. 1237-1243.
[14] Zhang et al., "Carbon nanotube architectures as catalyst supports for proton exchange membrane fuel cells," Energy Environ. Sci., 2010, vol. 3, pp. 1286-1293.
[15] Li et al., "Electro-catalytic oxidation of CO on Pt catalyst supported on carbon nanotubes pretreated with oxidative acids," Carbon, July 2006, vol. 44, pp. 2973-2983.
[16] Inaba et al., "Effect of Agglomeration of Pt/C Catalyst on Hydrogen Peroxide Formation," Electrochem. Solid State Lett., 2004, vol. 7, A474
[17] Wang et al., "Effect of the Pre-Treatment of Carbon Black Supports on the Activity of Fe-Based Electrocatalysts for the Reduction of Oxygen," J. Phys. Chem. B, March 1999, vol. 103, pp. 2042-2049.
[18] Drillet et al., "Development of self-supported single-wall carbon nanotube-based gas diffusion electrode with spatially well-defined reaction and diffusion layers," J. Power Sources, July 2010, vol. 195, pp. 8084-8088.
[19] Nallathambi et al., "Development of high performance carbon composite catalyst for oxygen reduction reaction in PEM Proton Exchange Membrane fuel cells," J. Power Sources May 2008, vol. 183, pp. 34-42.
[20] Oh et al., "Corrosion resistance and sintering effect of carbon supports in polymer electrolyte membrane fuel cells," Electrochim. Acta, 2009, vol. 54, pp. 6515
[21] Qu et al., "Nitrogen-Doped Graphene as Efficient Metal-Free Electrocatalyst for Oxygen Reduction in Fuel Cells," ACS Nano, February 2010, vol. 4, pp. 1321-1326.

What is claimed is:
1. A process for preparing a supported electrocatalyst, comprising:
treating a sample of multiwalled carbon nanotubes with an aqueous hydrochloric acid solution to remove impurities from the carbon nanotubes, and thereafter
treating the multiwalled carbon nanotubes with a solution comprising nitric acid and sulfuric acid, thereby providing oxidized multiwalled carbon nanotubes,
mixing the oxidized multiwalled carbon nanotubes with a mixture comprising polyaniline and a Fe species, and thereafter
vacuum-drying the mixture comprising multiwalled carbon nanotubes, polyaniline, and a Fe species to form a vacuum-dried mixture, and thereafter
subjecting the vacuum-dried mixture to ball-milling for 24 hours, and thereafter
heating the ball-milled mixture at a first temperature in an inert atmosphere, and thereafter
cooling the ball milled mixture, and thereafter
treating the cooled, ball milled mixture with aqueous sulfuric acid, and thereafter,
heat-treating the mixture at a second temperature in an inert atmosphere, thereby forming the supported electrocatalyst.

2. The process of claim 1, wherein the multiwalled carbon nanotubes have a BET surface area of approximately 230 square meters per gram.

3. The process of claim 1, wherein the aqueous hydrochloric acid solution comprises 1.0 molar hydrochloric acid.

4. The process of claim 1, wherein the step of mixing the oxidized multiwalled carbon nanotubes with a mixture comprising polyaniline and a Fe species comprises:

dispersing aniline in hydrochloric acid and thereafter adding the oxidant ammonium persulfate and ferric chloride, thereby forming a mixture comprising polyaniline and a Fe species, and thereafter, mixing oxidized multiwalled carbon nanotubes with the mixture comprising polyaniline and a Fe species.

5. The process of claim 1, wherein the first temperature is approximately 900° C.

6. The process of claim 1, wherein the second temperature is approximately 900° C.

\* \* \* \* \*